Sept. 19, 1950
H. O. C. INGRAHAM
2,522,576
ORE ROASTING
Filed June 18, 1947
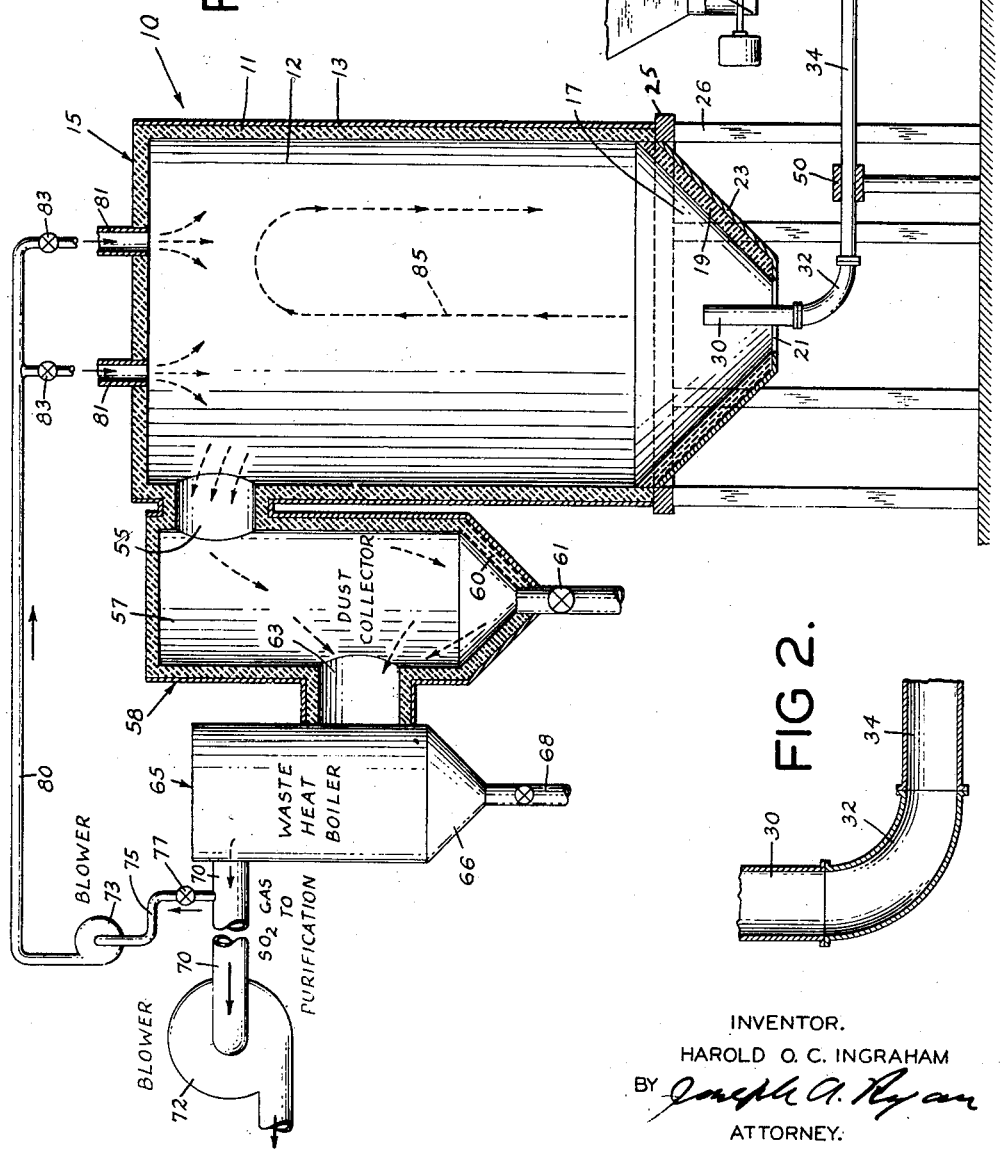
INVENTOR.
HAROLD O. C. INGRAHAM
BY *Joseph A. Ryan*
ATTORNEY.

Patented Sept. 19, 1950

2,522,576

UNITED STATES PATENT OFFICE 2,522,576

ORE ROASTING

Harold O. C. Ingraham, New York, N. Y., assignor to Allied Chemical & Dye Corporation, a corporation of New York Application June 18, 1947, Serial No. 755,384

6 Claims. (Cl. 75—9)

This invention relates to improvements in metallurgy and is more particularly directed to the suspension roasting of finely divided metal sulfides.

The principal objects of the present improvements include provision of processes for suspension roasting of sulfide fines by procedures in accordance with which the capacity of a given roasting unit may be increased to a large degree and by which there may be formed a high strength $SO_2$ gas and metal oxide cinder low in sulfur. Additionally, the invention affords operating methods carried out so as to regulate roasting temperatures in such a way as to minimize scarring the inner walls of the roasting chamber. It will be understood that so-called "scarring," i. e. formation of relatively large bodies of partly desulfurized ore or clinker on the inner walls of the roasting chamber, is a chief source of trouble causing low capacity, poor over-all recovery of sulfur from the fines being roasted, excessive wear and tear on the apparatus, and frequent periodic shutdowns to permit accretions to be manually gouged off the combustion chamber walls.

The nature of the invention, the objects and advantages thereof may be more fully understood from the following description taken in connection with the accompanying drawing showing in Fig. 1, partly in vertical section and partly diagrammatically, a preferred form of apparatus for carrying out the improved process, and in Fig. 2 an enlarged vertical section of an injector.

Referring to Fig. 1, numeral 10 designates a shaft furnace comprising a shell 11 constructed of suitable refractory material such as firebrick, and defining a combustion or roasting chamber 12 of circular horizontal cross-section. Surrounding shell 11 is a steel casing 13 acting as a protective reinforcement. The upper end of the combustion chamber is closed off by a crown 15 which may be planar or flatly arched. The over-all vertical length of the combustion zone 12 includes a hopper-like bottom and cinder collecting zone 17 formed by a cone-shaped, brick-faced hearth 19 terminating in a circular air inlet-cinder outlet opening 21. The hearth 19 and the encasing steel shell at 23 may be pitched at an angle less or greater than the angle of repose of the cinder formed in the process, although ordinarily such pitch is greater than the angle of repose since in the preferred operation of the process of the invention maintenance of a bed of cinder on the hearth is unnecessary.

The shaft burner is carried by sill 25 and pillars 26.

In accordance with the more desirable embodiments of the invention, the sulfide fines to be roasted are introduced into the combustion chamber preferably from a single, vertically directed injector 30 which, as shown in Fig. 1, is positioned preferably so as to be coaxial with the vertical axis of the combustion chamber. The injector communicates thru a connecting section 32 to a raw fines supply conduit 34 attached by a suitable flexible joint 36 to one end of a pipe 38 which opens at its opposite end into the pressure side of an air blower 40. Numeral 42 indicates the lower end of a supply hopper from which, by a screw conveyor 44, fines are continuously fed thru vertical pipe 45 into conduit 38. The junction of pipes 38 and 45 may be equipped with any suitable device to facilitate adequate suspension of the fines in the air stream in pipe 38 created by blower 40. Pipe 38 and its associated ore and air supply parts are held fixedly in position as by support 47. The invention provides for vertical and horizontal adjustment of injector 30, and for this purpose conduit 34 is flexibly attached at 36 to fixed pipe 38, and conduit 34, connecting section 32 and nozzle 30 are supported by any suitable device, represented diagrammatically at 50, by which nozzle 30 may be raised or lowered axially thru a substantial vertical distance and by which the horizontal position of the nozzle may be adjusted to some extent.

The gas main 55, for withdrawing sulfur dioxide gas from the combustion chamber opens into the latter at a point just below furnace crown 15. Ordinarily outlet 55 is radially positioned relative to the combustion chamber from which the gases are discharged into a dust chamber 57. The dust collector 58 is steel shelled and brick lined similarly to the shaft burner, the size of dust collecting chamber 57 relative to the size of the combustion zone 12 being approximately in the proportions shown on the drawing. The hopper bottom 60 of the dust collector is equipped with an air-lock 61 thru which dust may be withdrawn without admitting air to the gas stream.

The outlet conduit 63 of the dust chamber opens into the gas space of a waste heat boiler which may be of any construction known to be suitable for the purposes of this art and which is shown only diagrammatically at 65. The boiler gas space is provided preferably with a hopper bottom 66 and an air-locked outlet 68 for dust discharge. The cooled and relatively dust-free sulfur dioxide gas exiting the boiler flows into a gas main 70 which, beyond further gas processing e. g. purification not indicated on the drawing, is connected with the suction side of a main blower 72.

In accordance with the present invention, a portion of the cooled gas is bled out of main 70, by an auxiliary blower 73 and pipe 75 having a control valve 77, and forced under positive pressure by blower 73 thru conduit 80 which communicates with at least one pipe 81 preferably passing thru furnace crown 15 and opening into the combustion chamber 12 at its extreme upper end. While all the gas thus recycled thru the upper portions of combustion chamber 12 may be reintroduced thereto thru a single inlet pipe 81, to facilitate more even distribution of recycled gas throughout the upper area of the combustion zone and to permit general flexibility of operation, particularly with respect to reduction of velocity of recycled gas as it enters the top of the combustion chamber, the crown 15 is preferably provided with several duplicate inlet pipes 81 each provided with a control valve 83.

The major object of this invention is high capacity (daily tonnage of ore roasted) plus consistent production of a strong SO2 gas and the formation of an iron oxide cinder having a minimum sulfur content. During the commercial growth of suspension roasting it has been proposed to utilize combustion chambers of two general types: first, construction in which the combustion chamber has a relatively short vertical axis and a large diameter either approximately equal to or exceeding the length of the vertical axis; and second, the so-called "shaft" type which term has been utilized to designate a combustion chamber which is substantially elongated vertically and has a diameter often less than a half or a third of the length of the vertical axis. Top injection and bottom injection of fines are also known. During investigations leading to the improvements of this invention, it was found that the primary objective of high capacity per unit burner could be best obtained by bottom injection of fines into a vertically elongated combustion chamber, i. e. one having an over-all vertical dimension in excess of its horizontal dimension. In suspension roasting, two major difficulties encountered are control of temperatures in various parts of the combustion zone, and scar formation on the inner walls of the combustion chamber, the latter to some appreciable extent being a corollary of the former. Plant scale experimentation of utilization of bottom injection of fines and a vertically elongated combustion chamber showed that the temperature control and scar formation difficulties became so markedly pronounced as to offset prospective commercial advantages. According to the invention, it has been found that the high capacity objectives thereof may be obtained by injecting the fines into the bottom of a preferably vertically elongated combustion chamber, roasting the fines while in suspension in oxidizing gas, withdrawing sulfur dioxide gas from the top of the combustion chamber, cooling at least a portion of such withdrawn gas, and returning regulated quantities of cooled sulfur dioxide gas to the top of the combustion zone to effect temperature control therein.

The invention is applicable to the suspension roasting of metal sulfide fines such as iron pyrites, pyrrhotite, zinc sulfide or arsenopyrite, but for convenience, operation of the process may be described in connection with the roasting of iron pyrites. A typical suitable raw sulfide may consist of very finely ground iron pyrites ore by-product from a flotation operation, in which instance the material is generally finer than 300 mesh. Another example consists of massive pyrrhotite ore, dry ground and air classified to form a product containing, say, 3–5% coarser than 65 mesh, and about 70–75% finer than 200 mesh. However, in this specification and in the appended claims the term "fines" is intended to designate material of such degree of subdivision as may be roasted while suspended in an oxidizing gas.

As indicated, the roasting process of this invention is carried out in a vertically elongated combustion chamber, i. e. a roasting zone having a horizontal dimension less than the over-all height as taken from the crown 15 to the air inlet-cinder outlet 21. Preferably, the horizontal dimension is substantially less than the height and e. g. should not exceed about two-thirds of the vertical length of the combustion zone. It has been found the most satisfactory results are obtained when, as in the embodiment shown on the drawing, the horizontal dimension of the combustion zone is roughly half that of the vertical.

A supply of sulfide fines is maintained in bin 42 by suitable conveyer or elevator mechanism not shown. Before roasting is begun, combustion chamber 12 is preheated to temperature above the ignition point of the particular ore to be roasted as by the use of oil burners inserted through conveniently located work holes not shown.

After the desired degree of preheat is imparted to the furnace, main blower 72, fines conveyer 44 and blower 40 are put in operation, following which combustion supporting air is drawn into the combustion chamber thru air inlet-cinder outlet 21, fines drop thru pipe 45, are picked up by the air stream and carried along thru conduit 34. In the preferred embodiment, the fines are introduced into the combustion chamber thru a single injector which is located on the vertical axis of the roasting zone. To promote flexibility with respect to the velocity at which the fines are initially fed into the bottom of the combustion chamber, the injector 30 is of relatively large diameter. Since some appreciable horizontal travel of the fines suspension between the feed pipe 45 and injector 30 is usually required in commercial installations, it will be found desirable to utilize a conduit 34 having a diameter smaller than that of injector 30 so that a relatively high gas velocity may be obtained in conduit 34 to keep the fines adequately in suspension during horizontal travel. As shown on the drawing, the outlet end of injector 30 is preferably located well within and ordinarily at about the mid-point of the cinder collecting zone 17. It has been found that such location of the outlet end of the injector promotes dispersion of the fines and makes utilizable for roasting purposes practically the entire length of the cylindrical portion of the combustion zone. The vertical position of the outlet end of injector 30 may be regulated by adjustment of the supporting element 50.

At the start of the process, operation of conveyer 44, blower 40 and its associated valve 41 are adjusted so that a fairly average fines particle rises upwardly thru the combustion zone to a point approaching crown 15 before falling back toward the cinder hearth, the dotted line 85 of Fig. 1 approximately representing the course of travel of a representative ore particle. Of the total quantity of air needed to support fines oxidation in the combustion chamber, preferably only a minor portion is utilized to inject the fines, the major portion of air being drawn in thru the air inlet-cinder outlet 21. The amount of air charged into the combustion chamber by way of fines injector and blower 40 should not be more than about 25% by volume of the total and is usually about 20% and appreciably less. By having the open area of air inlet-cinder outlet 21 sufficiently large, and restricting to an operating minimum the amount of air fed into the combustion chamber with the fines thru injector 30, it is possible by regulation of main blower 72 to easily control and minimize the total volume of air brought into the combustion chamber and correspondingly increase the $SO_2$ strength of the product gas. Operation of blower 72 and the open area of air inlet-cinder outlet 21 are correlated so as to supply sufficient oxygen to effect substantially complete oxidation of the fines, so that the secondary air enters the lower end of the combustion chamber at a velocity less than the initial velocity of the fines, and so that the velocity of the stream of air passing only upwardly thru the combustion chamber is not sufficient to interfere with the free gravity fall of the fines. Another important factor contributing to the overall satisfactory results is that the bulk of the air utilized for roasting and drawn in thru opening 21 enters the combustion chamber in a stream surrounding the fines-air suspension discharged from injector 30. Such introduction of the major portion of the roasting air at the bottom of a hopper-like cinder collecting zone coupled with the diverging hearth 19 creates in the bottom of the combustion zone a strongly oxidizing atmosphere and provides an evenly dispersed, non-turbulent current of oxidizing gas rising throughout the length of the combustion chamber.

Ignition of fines takes place almost immediately upon discharge from injector 30. Since the atmosphere in the bottom of the combustion zone is strongly oxidizing, roasting proceeds rapidly. Locally, temperatures may be as high as 2200–2400° F. Because of the mode of introduction of the fines and of the major portion of air utilized for combustion, solid particles rise to an elevation below crown 15 and there is formed a relatively uniform dispersion of solids over a major portion of the upper end of the combustion chamber. Thereafter the particles settle toward hearth 19 in a more or less straight line at a rate substantially as induced by gravity. In this manner the fines are caused to pass substantially over the longest possible path of travel considering the proportions of the combustion chamber. During the latter part of the upward travel of fines, the rate of vertical movement rapidly decreases to zero, and during the initial part of the descent of the fines the rate of downward movement of the fines is relatively small. Hence while passing upwardly and downwardly thru the upper section of the combustion chamber, the average rate of movement of fines is slow and this slow rate of travel increases the time the particles are in the roasting atmosphere thereby giving a relatively long time for the reaction to proceed. The $SO_2$ gas produced is discharged from the top of the combustion chamber into dust collector 58.

In plant scale experimental work, utilizing a vertically elongated combustion chamber and unitary axial bottom injection of fines as described, it was found that temperature conditions in the top of the combustion chamber became uncontrollable and severe scarring of the upper ends of the inner walls of the combustion chamber, particularly in the areas adjacent $SO_2$ gas outlet 55, took place. The $SO_2$ gas atmosphere in the upper end of the combustion chamber contains two types of solid particles; first, the larger size particles which drop back onto hearth 19 as cinder, and secondly, cinder-dust particles which are lighter and are swept out of the combustion chamber thru outlet 55. In order to get anything like satisfactory commercial results in suspension roasting, it is necessary to handle large gas volumes and large total weights of fines. These factors unavoidably require passage thru the burner of a large volume of gas and entrainment in the $SO_2$ gas discharged from the combustion chamber of a heavy load of cinder dust. Thus, in the atmosphere in the upper end of a top take-off combustion chamber there is what may be considered as an overload of roasted and partially roasted fines which are readily susceptible to conversion to sticky or semi-plastic condition if temperature conditions so permit. Further, in roasting operations of the type described, it has been found that the upper end of the combustion zone is an area of potentially highest temperatures which if uncontrolled may run as high as 2200–2500° F. These situations promote ready scarring of the upper end of the combustion chamber walls, and cause all the attendant difficulties arising from scarring.

In accordance with this invention, it has been found that the foregoing markedly unfavorable conditions in the upper end of the combustion zone can be overcome by cooling at least a portion of the hot $SO_2$ gas discharged from the combustion chamber, and returning such cooled gas preferably to the extreme upper end of the combustion zone. In the practice of the instant process, the highly heated sulfur dioxide gas leaving the burner passes thru dust collector 58, in which most of the dust load is settled out, and then the gas is run thru the waste heat boiler 65. The design of the latter is such as to cut gas stream temperature down to the order of about 500–800° F. Thereafter, by regulation of the auxiliary blower 73 and valve 77 of pipe 75, a certain proportion of the cooled exit gas of the waste heat boiler is forced thru conduit 80 to combustion zone gas inlet pipes 81 in furnace crown 15. Desirably the cooled $SO_2$ gas thus recycled is distributed as evenly as mechanically feasible over the upper end of the combustion chamber 12.

The quantity of cooled $SO_2$ gas recycled to the top of the combustion chamber is dependent upon the degree to which such gas has been cooled and the magnitude of the roasting operation at hand. Such quantity should be sufficient to prevent incipient fusion of solids and cinder dust in the top of the combustion chamber, and to avoid resultant scar formation on the upper ends of the combustion zone walls. For example, any tendency toward scar formation may be observed thru conveniently located sight glasses if desired, and the amount of recycled gas increased accordingly. A preferred gauge of the quantity of gas to be recycled is the temperature of the sulfur dioxide gas at the point of discharge from the combustion chamber, i. e. in the outlet 55. It is preferred to regulate the total quantity of cooled SO₂ gas recycled to the combustion chamber so that gas temperature in the combustion chamber outlet 55 does not exceed about 2000° F., and best results are obtained where these temperatures are held in the range of about 1750–1950° F.

The cooled gas recycled to the combustion chamber makes possible the control of the temperature in the upper part of the combustion zone and reduces or prevents conversion of solid particles to the sticky state. Also, recycled gas creates a blanketing or cushioning effect which minimizes contact between the overload of solids in the upper end of the combustion chamber and the adjacent hot confining walls. I find that by regulation of recycling and conjunctive adjustment of the vertical position of the upper end of injector 30 and of the velocity at which the fines are initially introduced into the combustion chamber, it is easily possible to prevent contact of any substantial quantities of fines with the heated walls and top of the combustion chamber and avoid scarring difficulties particularly in the upper end of the combustion chamber, and at the same time substantially increase the total quantity of fines introduced thru injector 30 and correspondingly increase the total tonnage of fines roasted in a given burner unit.

Moreover, the recycled sulfur dioxide gas continually removes a large amount of heat from the combustion zone. In some types of suspension roasting processes, some degree of temperature control is had by passing thru the combustion zone substantially larger quantities of air than are actually needed to support fines oxidation. In these procedures, the air over and above that required for oxidation acts as a diluent and causes a substantial reduction of the SO₂ strength of the gas discharged from the roasting zone. However, in the operation of the process of this invention, by recycling sulfur dioxide gas, cooled to temperatures of the order of 500–800° F., in quantity to maintain temperature in the combustion chamber outlet 55 approximately as indicated, substantially all of the excess heat from the roasting operation may be removed from the roasting zone by means of recycled gas. The result is that no more air than is required to support fines oxidation need be introduced into the combustion chamber. Accordingly, there is in the system no substantial amount of air which functions only as a diluent, and it is possible to make a correspondingly high SO₂ strength product gas. The volume (N. T. P.) of cooled recycled sulfur dioxide gas, relative to the total volume of air charged into the combustion zone thru injector 30 and air inlet-cinder outlet 21, may vary from 50–90%, and in average operations is of the order of 60–80%.

In one practical example of operation of the process of the invention, the combustion chamber used had a diameter of about 25 feet and an overall vertical dimension of about 50 feet. The fines employed were ground pyrrhotite ore containing about 32% sulfur and having particle size distribution as follows: 4–5% on 65 mesh, 4–6% thru 65 on 100 mesh, 15–17% thru 100 on 200 mesh, and 70–75% thru 200 mesh. The injector had an inside diameter of about 10 inches and extended into the cinder collecting zone a distance of about 7 feet. A blower such as 40 was driven to create an air pressure of about 17 inches of water in conduit 34 thru which about 1250 cu. ft. per minute of air were charged into the combustion zone as primary air along with the fines.

The main blower 72 produced at the air inlet-cinder outlet opening 21 at the base of the combustion chamber a minus pressure of about 0.25 inch of water. About 4800 cu. ft. per minute of air were drawn in at opening 21 as secondary air. The blower 73 and associated parts functioned so as to recycle thru the combustion zone about 3600 cu. ft. per minute (N. T. P.) of sulfur dioxide gas cooled to temperature of about 700° F., such gas being introduced into the center of the burner top thru a 14 inch pipe. During this operation, the temperature of the gas leaving the burner thru port 55 was about 1800–1850° F. and contained 10% SO₂. Of the total recoverable cinder, about 52% was discharged thru the cinder outlet 21 and about 48% was recovered from the dust collector and boiler hoppers. Burner cinder averaged 1.2% sulfur, while the dust averaged .48% sulfur. The total composite cinder and dust discharged from the process averaged .85% sulfur, and the sulfide fines input to the furnace was about 133 tons per 24 hours.

I claim:

1. The method of roasting metal sulfide fines to produce sulfur dioxide which comprises introducing a stream of oxidizing gas suspended sulfide fines at the center of the base portion of a vertically elongated combustion chamber heated to temperature above the ignition point of the fines and having a horizontal dimension substantially less than the height, passing the fines upwardly and then downwardly over a distance approaching the vertical dimension of said combustion chamber, adjusting the velocity of introduction of the fines so as to cause the fines to move thru an extended path and to prevent contact of any susbtantial quantities of fines with the heated walls and top of said combustion chamber, introducing into the combustion chamber, in a stream surrounding said fines at their point of introduction, a quantity of oxidizing gas constituting the major portion of the total oxidizing gas needed to support oxidation of said fines, flowing such oxidizing gas, at velocity less than the initial velocity of the fines and low enough to substantially avoid interference with gravity fall of the fines, in upward direction only thru the combustion chamber in countercurrent flow to the downwardly flowing fines so that the downwardly flowing fines pass thru a roasting atmosphere increasingly rich in oxygen, said fines being roasted under conditions in which potentially maximum temperatures are created in the upper end of the combustion chamber, withdrawing sulfur dioxide gas from the upper end of the combustion chamber, cooling at least a portion of said withdrawn sulfur dioxide gas, and returning cooled sulfur dioxide gas to the upper end of the combustion chamber in quantity to maintain the sulfur dioxide gas as withdrawn from the combustion chamber at temperature in the range of 1750–1950° F.

2. The method of roasting metal sulfide fines to produce sulfur dioxide which comprises introducing a stream of oxidizing gas-suspended sulfide fines at the center of the base portion of a vertically elongated combustion chamber heated to temperature above the ignition point of the fines and having a horizontal dimension substantially less than the height, passing the fines upwardly and then downwardly over a distance approaching the vertical dimension of said combustion chamber, adjusting the velocity of introduction of the fines so as to cause the fines to move thru an extended path and to prevent contact of any substantial quantities of fines with the heated walls and top of said combustion chamber, introducing into the combustion chamber, in a stream surrounding said fines at their point of introduction, a quantity of oxidizing gas constituting the major portion of the total oxidizing gas needed to support oxidation of said fines, flowing such oxidizing gas in upward direction only thru the combustion chamber, withdrawing sulfur dioxide gas from the upper end of the combustion chamber, cooling at least a portion of said withdrawn sulfur dioxide gas, and returning cooled sulfur dioxide gas to the upper end of the combustion chamber in quantity to maintain the sulfur dioxide gas as withdrawn from the combustion chamber at temperature less than 2000° F.

3. The method of roasting metal sulfide fines to produce sulfur dioxide which comprises introducing a stream of sulfide fines through the central portion of the base of a combustion chamber heated to temperature above the ignition point of the fines, passing the fines upwardly and then downwardly over a distance approaching the vertical dimension of said combustion chamber, introducing into the base portion of the combustion chamber, in a stream separate from and at a velocity less than the initial velocity of said stream of fines, a quantity of oxidizing gas constituting the major portion of the total oxidizing gas needed to support oxidation of said fines, flowing such oxidizing gas in upward direction only thru the combustion chamber in countercurrent flow to downwardly flowing fines, withdrawing sulfur dioxide gas from the upper end of the combustion chamber, cooling at least a portion of said withdrawn sulfur dioxide gas, and returning cooled sulfur dioxide gas to the upper end of the combustion chamber in quantity to maintain the sulfur dioxide gas as withdrawn from said combustion chamber at temperature less than 2000° F.

4. The method of roasting metal sulfide fines which comprises introducing sulfide fines at the base portion of a combustion chamber heated to a temperature above the ignition point of the fines, passing fines upwardly and then downwardly over a distance approaching the vertical dimension of said combustion chamber, introducing into the base portion of the combustion chamber, in a stream separate from and at a velocity less than the initial velocity of said fines, a quantity of oxidizing gas constituting the major portion of the total oxidizing gas needed to support oxidation of said fines, flowing such oxidizing gas in upward direction only through the combustion chamber in countercurrent flow to downwardly flowing fines, withdrawing sulfur dioxide gas from the upper end of the combustion chamber, said fines being roasted while in gaseous suspension and under conditions in which there are created in the upper end of the combustion chamber potentially maximum temperatures and a sulfur dioxide gas atmosphere containing fusible solids including a substantial quantity of cinder-dust, cooling at least a portion of said withdrawn sulfur dioxide gas, and returning cooled sulfur dioxide gas to the upper end of the combustion chamber in quantity to facilitate maintaining said atmosphere at a temperature below that of incipient fusion of said solids and cinder-dust and to prevent substantial scar formation on the upper walls of the combustion chamber.

5. The method of roasting metal sulfide fines in a combustion chamber having a conical shaped zone at the bottom formed by a hopper-like base, which comprises heating said chamber to a temperature above the ignition point of the fines, introducing a stream of said fines through the central portion of the base, passing fines upwardly and then downwardly over a distance approaching the vertical dimension of said combustion chamber, introducing into the central portion of said base, in a stream separate from and at a velocity less than the initial velocity of said stream of fines, a quantity of oxidizing gas constituting the major portion of the total oxidizing gas needed to support oxidation of said fines, flowing such oxidizing gas upwardly through said conical zone in a progressively diverging stream, and in upward direction only through the combustion chamber in countercurrent flow to downwardly flowing fines, withdrawing sulfur dioxide gas from the upper end of the combustion chamber, cooling at least a portion of said withdrawn sulfur dioxide gas, and returning cooled sulfur dioxide gas to the upper end of the combustion chamber in quantity to maintain the gaseous atmosphere of said upper end at a temperature below that of incipient fusion of solids and cinder-dust suspended in said upper end to prevent substantial scar formation on the upper walls of the chamber.

6. The method of roasting metal sulfide fines to produce sulfur dioxide which comprises introducing a stream of sulfide fines at the center of the base portion of a vertically elongated combustion chamber heated to temperature above the ignition point of the fines and having a horizontal dimension substantially less than the height, passing the fines upwardly and then downwardly over a distance approaching the vertical dimension of said combustion chamber, introducing into the combustion chamber, in a stream surrounding said fines at their point of introduction, a quantity of oxidizing gas constituting the major portion of the total oxidizing gas needed to support oxidation of said fines, flowing such oxidizing gas in upward direction only through the combustion chamber in countercurrent flow to downwardly flowing fines, withdrawing sulfur dioxide gas from the upper end of the combustion chamber, cooling at least a portion of said withdrawn sulfur dioxide gas, and injecting cooled sulfur dioxide gas downwardly at a plurality of points into the top of the combustion chamber in quantity to maintain the sulfur dioxide gas as withdrawn from said combustion chamber at temperature less than 2000° F.

HAROLD O. C. INGRAHAM.

REFERENCES CITED

The following references are of record in the file of this patent:

UNITED STATES PATENTS

| Number | Name | Date |
|---|---|---|
| 1,400,443 | King et al. | Dec. 13, 1921 |
| 1,912,621 | Clark | June 6, 1933 |
| 2,088,195 | Ferguson | July 27, 1937 |
| 2,089,306 | Stimmel et al. | Aug. 10, 1937 |